(12) United States Patent
Zang et al.

(10) Patent No.: US 8,359,006 B1
(45) Date of Patent: Jan. 22, 2013

(54) USING COMMUNICATIONS RECORDS TO DETECT UNAUTHORIZED USE OF TELECOMMUNICATION SERVICES

(75) Inventors: Hui Zang, Cupertino, CA (US); Travis E. Dawson, San Francisco, CA (US)

(73) Assignee: Sprint Communications Company L.P., Overland Park, KS (US)

(*) Notice: Subject to any disclaimer, the term of this patent is extended or adjusted under 35 U.S.C. 154(b) by 260 days.

(21) Appl. No.: 12/940,215

(22) Filed: Nov. 5, 2010

(51) Int. Cl.
*H04M 1/66* (2006.01)
(52) U.S. Cl. .................................. 455/410; 455/411
(58) Field of Classification Search .............. 455/410, 455/405, 406
See application file for complete search history.

(56) References Cited

U.S. PATENT DOCUMENTS

| | | | |
|---|---|---|---|
| 5,220,593 A * | 6/1993 | Zicker et al. ............... | 455/407 |
| 5,907,602 A * | 5/1999 | Peel et al. .................. | 379/114.14 |
| 6,181,925 B1 * | 1/2001 | Kaminsky et al. .......... | 455/410 |
| 6,185,416 B1 * | 2/2001 | Rudokas et al. ............ | 455/410 |
| 6,212,266 B1 * | 4/2001 | Busuioc ..................... | 379/189 |
| 6,219,538 B1 * | 4/2001 | Kaminsky et al. .......... | 455/410 |
| 2002/0184080 A1 * | 12/2002 | Murad et al. ............... | 705/10 |
| 2002/0188712 A1 * | 12/2002 | Caslin et al. ............... | 709/223 |
| 2004/0249866 A1 * | 12/2004 | Chen et al. ................. | 707/200 |
| 2007/0124246 A1 * | 5/2007 | Lawyer et al. .............. | 705/50 |
| 2009/0094618 A1 * | 4/2009 | Huntsman ................... | 719/318 |
| 2009/0129573 A1 * | 5/2009 | Gavan et al. ................ | 379/189 |

FOREIGN PATENT DOCUMENTS

EP 0981068 1/1999

OTHER PUBLICATIONS

Burge, Peter, et al., Detecting Cellular Fraud Using Adaptive Prototypes., Department of Computer Science, Royal Holloway University of London, England., 1997.
Burge, Peter, et al., Fraud Detection and Management in Mobile Telecommunications Networks., Royal Holloway University of London, England.
Fawcett, Tom, et al., Adaptive Fraud Detection, NYNEX Science and Technology, White Plains, NY., 1997.
Fawcett, Tom, et al., Activity Monitoring: Noticing interesting changed in behavior., Bell Atlantic Science and Technology, White Plains, NY., 1999.
Moreau, Yves, et al., A hybrid system for fraud detection in mobile communications., 1999.
Britos, Paola, et al., Unusual Changes of Consumption Detection in Mobile Phone Users, Software & Knowledge Engineering Center Graduate School, Buenos Aires Institute of Technology, 2006.
Gopal, Rupesh, K., et al., A Rule-based Approach for Anomaly Detection in Subscriber Usage Pattern, 2007.

* cited by examiner

*Primary Examiner* — Jinsong Hu
*Assistant Examiner* — Michael Nguyen

(57) ABSTRACT

Subject matter described herein is directed to detecting fraudulent use of telecommunication services. Different attributes (e.g., dialed number, start location, start time, end time, etc.) are analyzed that describe communication instances. When an authorized-use parameter is violated, fraudulent use can be detected. Once unauthorized use of services with a mobile device has been detected, a location of the mobile device can be used to determine a locus of fraudulent activity.

17 Claims, 4 Drawing Sheets

USING COMMUNICATIONS RECORDS TO DETECT UNAUTHORIZED USE OF TELECOMMUNICATION SERVICES

CROSS REFERENCE TO RELATED APPLICATIONS

This application is related by subject matter to another application identified by Ser. No. 12/940,194, which is titled "Using Communications Records to Detect Unauthorized Use of Telecommunication Services." The application identified by Ser. No. 12/940,194 is being filed on the same date as this application and is fully incorporated herein by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

At a high level, ways of detecting fraud in a telecommunications environment are provided. Communication records of a mobile device include attributes that describe communication instances of the device. For example, communication records might include dialed numbers and call-origination locations of a mobile device's voice calls. The communication records are analyzed to determine if any thresholds are violated. Threshold violations suggest fraudulent use and prompt a fraud-detection response.

BRIEF DESCRIPTION OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
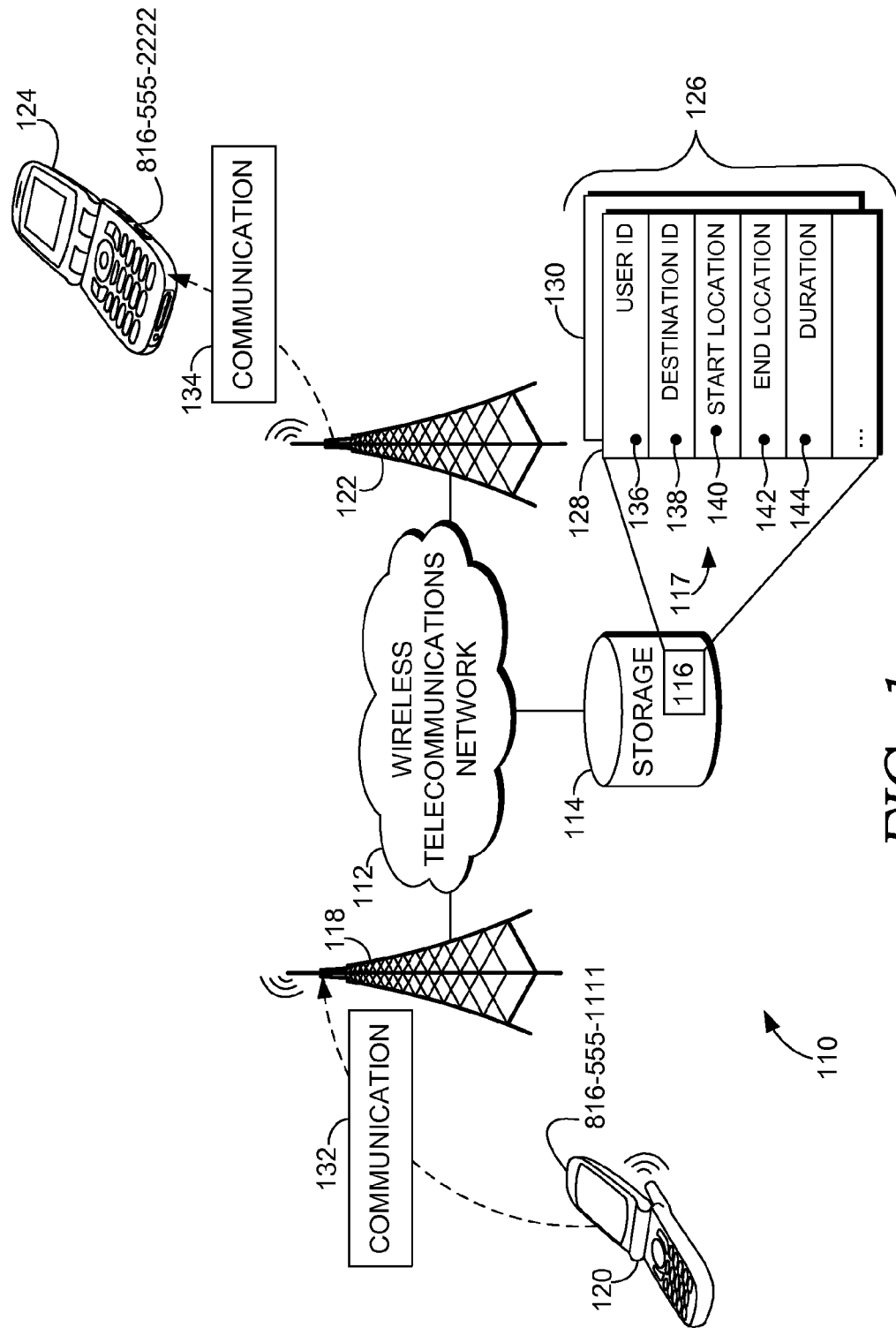
FIG. 1 depicts an exemplary operating environment in accordance with an embodiment of the present invention.

Referring now to FIG. 1, an exemplary operating environment suitable for practicing an embodiment of the technology is depicted and identified generally by reference numeral 110. Operating environment 110 includes a wireless telecommunications network 112. Wireless telecommunications network 112 is capable of communicating various technologies, such as CDMA, GPRS, GSM, and WiMAX.

Various components depicted in operating environment 110 communicate by way of wireless telecommunications network 112. One such component includes a first base transceiver station or tower 118. Base station 118 is capable of wirelessly communicating with a first mobile device 120. Similarly, a second base transceiver station or tower 122, which communicates with base station 118 by way of wireless communication network 112, can communicate with a second mobile device 124. Moreover, mobile devices 120 and 124 can communicate with one another using towers 118 and 122 and wireless communication network 112. For example, mobile device 120 might send an outgoing communication 132, such that mobile device 124 receives an incoming communication 134. Communication 132 might be sent in a variety of contexts. For example, mobile device 120 might initiate a voice call, send an instant message or a text message, send an email, or send a voicemail. Although FIG. 1 depicts a communication being exchanged between mobile devices 120 and 124, a communication might also include a request by mobile device 120 to receive data (e.g., web content), the delivery of which is facilitated by network 112. Also, an event associated with sending communication 132 might be referred to herein as a communication instance or a communication session.

In one embodiment, wireless telecommunications network 112 is coupled to storage 114. Storage 114 includes information 116, which is depicted in an exploded view 117 for illustrative purposes. Exploded view 117 includes a set of communication records 126. Set 126 includes individual communication records 128 and 130 that include communication attributes (e.g., user id, destination id, start location, end location, duration, etc). Each record of communication information corresponds to a respective communication, such as communication 132. A respective communication corresponding to each record 128 and 130 might include various types of communication. For example, as previously indicated, a communication might include a voice call, instant message or a text message, an email, a voicemail, or a combination thereof. Sometimes, communication information is referred to as Call Data Records (CDR).

For illustrative purposes, communication record 128 corresponds to communication 132. That is, record 128 is generated in response to communication 132 and includes various communication attributes that describe communication 132. Likewise, another communication record might be created to describe communication 134. In one embodiment of the present invention, communication record 128 includes a user identifier 136, which identifies a user, a mobile device, an account, or a combination thereof. That is, since device 120 engaged in communication 132 and record 128 is created to describe communication 132, user identifier 136 identifies device 120, a user of device 120, or an account that device 120 is authorized to use to access network 112. User identifier 136 might also identify an account, which authorizes device 120 to utilize services of wireless telecommunications network 112.

Communication record 128 includes other fields that are associated with and that describe communication 132. For example, other fields include a destination identifier 138 corresponding to another endpoint of communication 132 (i.e., the destination of an outgoing call or the origination of an incoming call); a start location 140 representing a location of mobile device 120 when communication 132 was initiated; an end location 142 representing a location of mobile device 120 when communication 132 was terminated or completed; and a duration 144 of communication 132. An exemplary start location or end location might include a BTS identifier, a cell, a sector, a city, a zip code, a state, a geographical coordinate, or a combination thereof. These fields are exemplary and other embodiments might include more, fewer, or different fields in each communication record.

Figure 2:
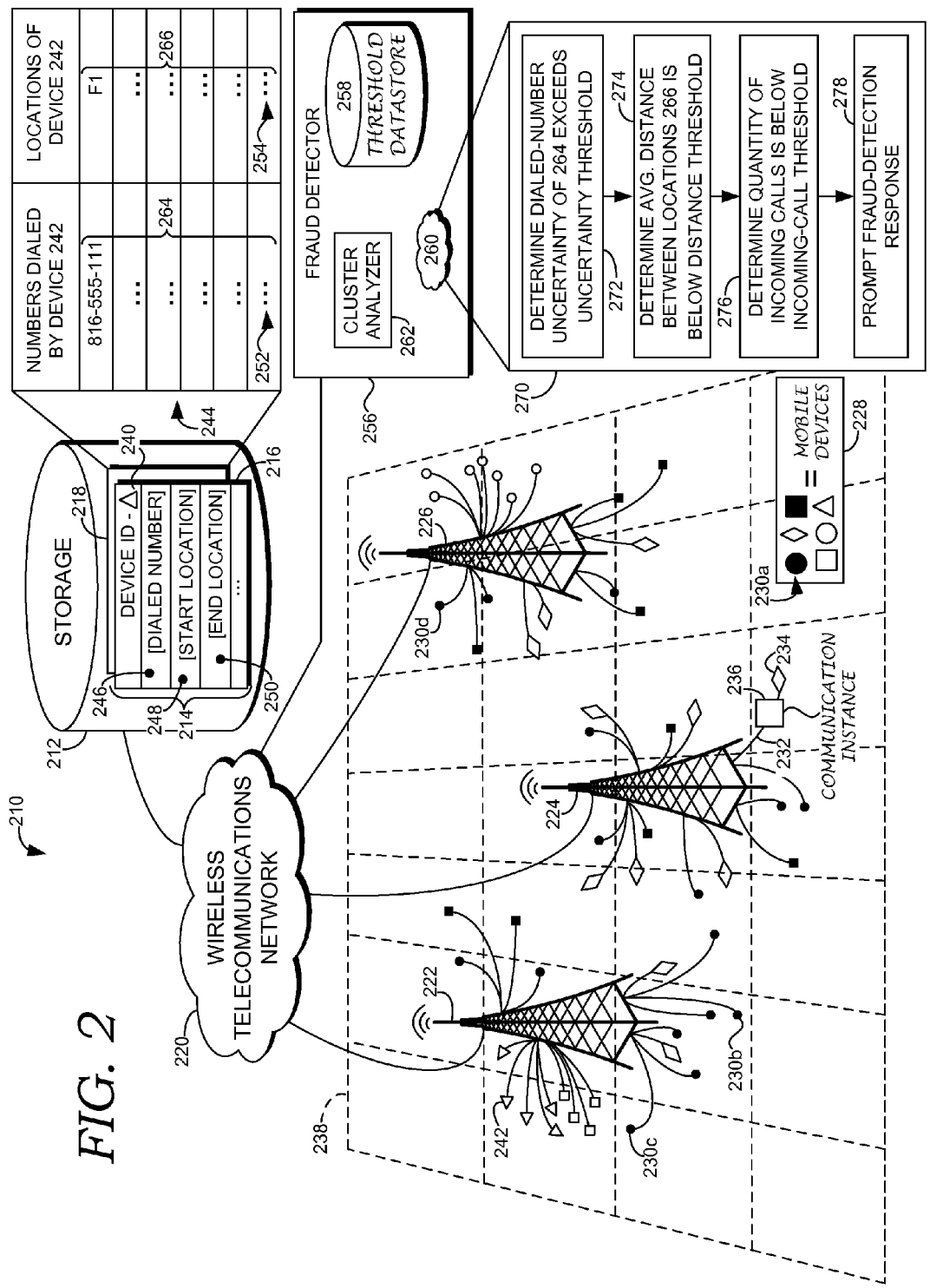
FIG. 2 depicts an exemplary operating environment in accordance with an embodiment of the present invention.

Referring now to FIG. 2, another exemplary operating environment suitable for practicing an embodiment of the technology is depicted and identified generally by reference numeral 210. Operating environment 210 includes subject matter that leverages communication records and the attributes included therein, such as set 126 and individual records 128 and 130 that were described with respect to FIG. 1. Communication records and attributes are also depicted in FIG. 2. For example, storage 212 includes a set 214 of communication records. Set 214 includes individual records 216 and 218. Although only two records 216 and 218 are depicted in FIG. 2, in other embodiments set 214 includes several (e.g., hundreds, thousands, etc.) additional records.

An embodiment of the invention is directed to analyzing information included in set 214 to detect fraudulent or unauthorized use of a mobile device. One example of fraudulent use includes establishing a telecommunications account with falsified information (e.g., fictitious name and/or stolen credit card). Such an account, which is established with falsified information, allows use of services provided by network 220. For example, an individual that set up the account might charge other persons a fee to use a mobile device associated with the account. Charges that are applied to the account (e.g., monthly charges pursuant to a contract) are often not paid. Because the account was established with falsified information, a telecommunication-service provider might have little recourse to obtain payment for services rendered.

In some situations, an individual might set up multiple fraudulent accounts that are associated with a plurality of mobile devices. The mobile devices are provided to other persons that pay the individual in exchange for the individual allowing the other persons to use the mobile devices. These plurality of mobile devices are often used in a similar geographical location, thereby creating a locus of fraudulent activity. This locus might be referred to as a "call shop." Although a call shop often includes multiple devices associated with multiple accounts, embodiments of this invention are also applicable when an individual allows others to use a single mobile device, which is associated with one fraudulent account.

Components depicted in FIG. 2 communicate with one another in a manner similar to that described with respect to FIG. 1. That is, FIG. 2 includes a wireless telecommunications network 220; towers 222, 224, and 226; and several mobile devices. As indicated by legend 228, mobile devices are represented by a respective symbol. For example, every depiction of a filled-in circle 230a represents a same mobile device 230b-230d that is engaging in a communication instance at a particular location.

Each line connecting a symbol to a tower represents a communication instance. For example, line 232 indicates that mobile device 234 is engaging in a communication instance 236. As such, FIG. 2 depicts six different mobile devices engaging in various communication instances at different instances in time. The communication instances take place at various locations within a geographic region, which is depicted by grid 238. An embodiment of the present invention is directed to determining if any of the six different mobile devices are being used in a fraudulent or unauthorized manner, such as in a call-shop environment.

When a mobile device (e.g., 234) engages in a communication instance (e.g., 236) a communication record is generated and maintained in storage 212. For example, record 216 includes a triangle 240, which serves as a device identifier of mobile device 242. Accordingly, record 216 is generated when mobile device 242 engages in a communication instance. For explanatory purposes herein, set 214 includes records 216 and 218 that are generated by communication instances of mobile device 242. As previously indicated, although only two records 216 and 218 are depicted in FIG. 2, set 214 might include several (e.g., hundreds, thousands, etc.) more records, each of which describes a communication instance of mobile device 242.

Communication record 216 includes various instance attributes that describe a corresponding communication instance. For example, communication record 216 includes a device id, a dialed number, a start location, and an end location. Moreover, communication record 216 might include several other instance attributes that are not depicted, such as a start time, an end time, and a communication type (e.g., text message, incoming voice call, outgoing voice call, voice message, and data request).

For illustrative purposes, an exploded view 244 depicts information that is included among set 214. Exploded view 244 includes a set of dialed numbers 264 and a set of communication-instance locations 266. A dialed number (e.g., 246) includes a number (e.g., cell-phone number) that identifies an intended recipient device of an outgoing communication (e.g., voice call, text message, etc.). A communication-instance location might include a location at which a communication instance is initiated (i.e., start location 248). Alternatively, a communication-instance location might include a location at which a communication instance ends or is terminated (e.g., end location 250). Locations might be indicated with varying degrees of specificity. For example, a location might be indicated using a set of geographical coordinates, a cell identifier, a cell-sector identifier, and a base-station location. Although a limited quantity of dialed numbers and locations is depicted in FIG. 2, set 214 might include several additional dialed numbers and locations as indicated by ellipses 252 and 254.

Fraud detector 256 communicates with network 220 and includes a threshold datastore 258 and an application 260. That is, fraud detector 256 includes a set of embodied computer-executable instructions that facilitates various functional aspects of embodiments of the invention. For example, fraud detector 256 includes application 260 that is executed by fraud detector 256. Further, fraud detector 256 includes a computing device having components (e.g., processor and computer-readable media) that enable execution of application 260 and that enable fraud detector 256 to detect unauthorized use of telecommunication services.

In an embodiment, threshold datastore 258 includes a set of authorized-use parameters. An authorized-use parameter suggests an instance-attribute value that is common or typical among mobile devices that are used in a nonfraudulent manner. For example, a legitimately used mobile device usually both initiates outgoing communications (e.g., voice calls, text messages, etc.) and receives incoming communications. Therefore, a threshold of one (1) incoming call might be established, such that when a mobile device receives zero incoming calls in a period of time (e.g., one week), fraudulent activity is detected. Additional exemplary thresholds will be described in more detail below.

Fraud detector 256 analyzes attributes in set 214 that are associated with mobile device 242. For example, fraud detector 256 might analyze attributes that are collected during a time period, such as a day, a week, or a month. By analyzing attributes in set 214, fraud detector 256 can quantify characteristics of mobile device 242 to be compared against thresholds stored in threshold data store 258. In embodiments of the present invention, fraud detector might analyze attributes either offline or in real time, In one embodiment, fraud detector 256 utilizes set 214 to quantify a measure of uncertainty of an instance attribute (e.g., location, call time, dialed number, etc.) associated with mobile device 242. A measure of instance-attribute uncertainty uses previously received records to suggest a likelihood that an attribute can be correctly predicted for subsequent communication instances. In an embodiment of the invention, a high uncertainty of an attribute suggests that the attribute is less predictable when describing subsequent communication instances.

Uncertainty might be calculated for various attributes, such as location or dialed number. For example, dialed-number information (e.g., 246) might be collected for a period of time (e.g., day, week, month, etc.) and analyzed to quantify an uncertainty in the dialed-number pattern of one or more users carrying device 242. When a mobile device engages in communication instances with a variety of dialed numbers within the period of time, the uncertainty of the dialed-number attribute might be higher as compared to a mobile device that engages in several communication instances with only a couple of different dialed numbers. An amount of dialed-number uncertainty might suggest whether a mobile device is being used in a fraudulent manner, such as when an account is established with invalid information. For example, it might be expected that, when a mobile device is being used in a legitimate manner, a predictable set of numbers are dialed over the course of a period of time. In contrast, when a mobile device is being used by many different users, such as in a call-shop environment, the dialed numbers are not the same over a period of time, such that a measure of dialed-number uncertainty (i.e., predictability) is relatively high.

In an embodiment, a period of time (e.g., one day, one week, etc.) is analyzed during which mobile device 242 engages in communication instances with m dialed numbers, which are identified as $B_1, B_2, \ldots, B_m$. As such, a measure of dialed-number uncertainty is quantified based on Shannon entropy and is calculated using Formula I, represented as:

$$H(X) = -\sum_{i=1}^{n} p(x_i)\log_2 p(x_i)$$

When analyzing a measure of dialed-number uncertainty over a period of time, variable $x_1$ of Formula I might be defined as $k_i/T$, such that a Formula II is represented as:

$$H(A) = -\sum_{i=1}^{m} (k_i/T)\log_2(k_i/T)$$

Pursuant to Formula II, $k_i$ is a number of times mobile device 242 engaged in a communication with dialed number $B_i$ during the period of time, and T is the total number of communication instances of device 242 that includes dialed numbers. As such, $k_i/T$ is a fraction of dialed numbers that mobile device 242 engaged with (e.g., sent a transmission to) $B_i$. In an embodiment of the present invention, a measure of entropy is calculated using Formula II over a period of time, such as a day or a week. For example, mobile device 242 might engage in various communication instances over the course of a day, the various communication instances including a variety of dialed numbers. As such, communication records of the various communication instances over the course of the day are collected and stored, and the entropy of the variety of dialed numbers is calculated using Formula II. Although the above example describes calculating entropy using Formula II at the end of a day, Formula II might also be used to calculate entropy over a week or any other desired time period.

In an embodiment, a measure of dialed-number uncertainty might suggest how mobile device 242 is being used. As described above, when a mobile device is being used in a legitimate manner, the same numbers might be dialed over the course of a period of time, and, when a mobile device is used in a call-shop environment, a wide variety of numbers are dialed over the course of the time period. As such, threshold database 258 might include a dialed-number-uncertainty threshold that quantifies a maximum amount of dialed-number uncertainty (e.g., Shannon-entropy threshold) expected when a mobile device is used in an authorized manner. Alternatively, the dialed-number-uncertainty threshold might quantify a minimum amount of dialed-number uncertainty expected when a mobile device is used in an unauthorized manner. As such, when a measure of dialed-number uncertainty exceeds the dialed-number-uncertainty threshold, the measure suggests that the mobile device is being used in an unauthorized manner.

In another embodiment, fraud detector 256 utilizes information in set 214 to analyze a ratio of outgoing calls to incoming calls. As previously described, a legitimately used mobile device commonly both initiates outgoing communications (e.g., voice calls, text messages, etc.) and receives incoming communications. In contrast, a mobile device that is used in a call-shop environment might initiate a far greater number of outgoing communication instances than the number of incoming communications that are received. Therefore, an incoming-call threshold (e.g., one (1) incoming call) might be established and stored in threshold datastore 258. As such, fraud detector 256 compares a number of incoming-call communication instances included among set 214 to the incoming-call threshold stored in datastore 258. When the number of incoming-call communication instances in set 214 is below the incoming-call threshold, fraud detector 256 detects that mobile device 242 is possibly being used in a fraudulent manner.

Fraud detector 256 might apply other analysis to attributes in set 214 to determine whether mobile device 242 is being fraudulently used. For example, when a mobile device is used in a legitimate manner, a customer typically engages in communication instances using a variety of base stations (e.g., 222, 224, and 226), which might be positioned in a variety of locations (e.g., different zip codes, different cities, different states, etc.). In contrast, when a mobile device is used in a call-shop environment, various mobile-device users engage in communication instances within a relatively small geographic area, such as within the same cell or cell sector. That is, when a mobile device is fraudulently used, the communication-instance locations are often relatively close to one another and close to a communication-instance locus.

Figure 3:
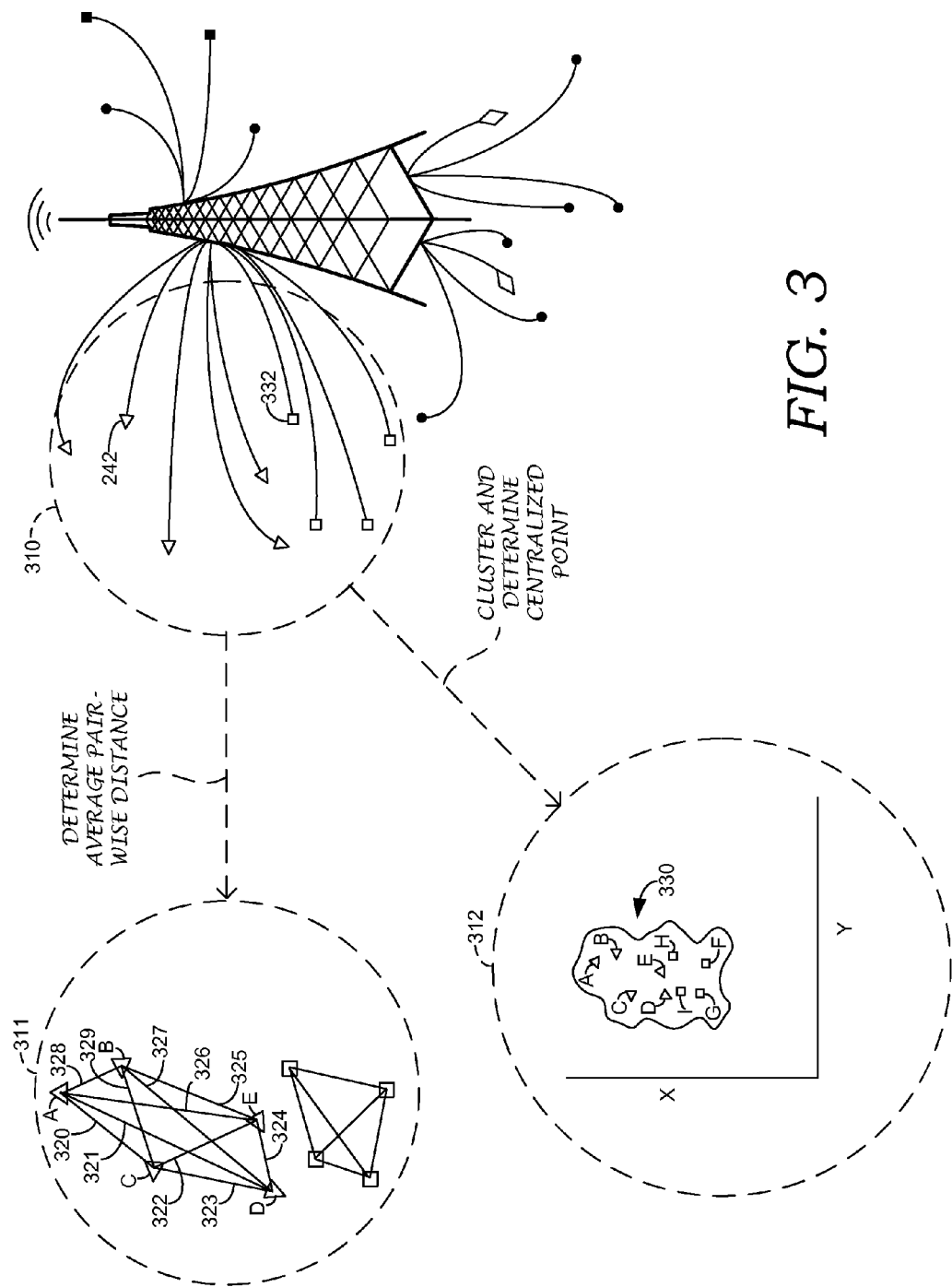
FIG. 3 depicts mathematical steps taken in accordance with an embodiment of the present invention.

In one embodiment of the present invention, fraud detector 256 might determine an average distance between communication-instance locations of set 214. For example, fraud detector 256 might calculate a pair-wise distance between each location in the set of locations and calculate an average of all pair-wise distances among the set of locations. Reference is made to FIG. 3 for illustrative purposes. FIG. 3 depicts a larger view of tower 222 and various mobile devices that are depicted in FIG. 2.

FIG. 3 includes circle 310 that encircles mobile device 242 and that is shown in an exploded view 311 for illustrative purposes. Mobile device 242, which is represented by a triangle, is depicted at a total of five different locations A-E at which mobile device 242 engages in a communication instance. Each of the five locations A-E represents a different communication-instance location and might be either a location at which a communication instance was initiated or a location at which a communication instance was terminated. Arrow 312 indicates that an average pair-wise distance is determined of all locations A-E. That is, ten (10) different distances 320-329 are determined, and the average of distances 320-329 is determined. This average of distances 320-329 represents an average pair-wise distance.

Returning to FIG. 2, threshold datastore 258 might include a distance threshold, which includes a minimum average distance between communication-instance locations that is expected when a device is being used by a legitimate customer. That is, when a mobile device is used in a legitimate manner at various communication-instance locations, an average distance between the various communication-instance locations is typically at least as long as the distance threshold stored in threshold datastore 258. Accordingly, if communication-instance locations included in set 214 generate an average pair-wise distance that is below the distance threshold, fraud detector 256 might determine that mobile device 242 is engaged in fraudulent activity, such as being used in a call shop.

In a further embodiment, when fraud detector 256 deems that fraudulent activity might be occurring, such as when one or more thresholds in threshold datastore 258 are violated, fraud detector 256 (or an equivalent component in communication with network 220) prompts a fraud-detection response. Exemplary fraud-detection responses include flagging an account associated with mobile device 242, sending a notification to a notification recipient (e.g., network representative), and terminating services provided to mobile device 242.

Another fraud-detection response includes clustering locations A-E of mobile device 242 with a set of locations of mobile devices that share a geographical relationship. For example, locations A-E of mobile device 242 might be clustered with locations of other mobile devices that have also been identified as possibly perpetuating fraudulent use. Referring again to FIG. 3, circle 310 also encircles mobile device 332 that is represented as a square. Mobile device 332 is depicted in four different locations F-I, such that an average pair-wise distance of locations F-I might violate a distance threshold. In an embodiment of the invention, locations of mobile device 242 are clustered with locations of mobile device 332. For example, cluster analyzer 262 might apply a distance-based clustering algorithm to cluster locations A-E of mobile device 242 with locations F-I of mobile device 332. As such, circle 312 shows a graphical representation of a cluster 330 of locations A-E and F-I. While for illustrative purposes, a relatively small number of locations might be represented by locations A-E and F-I, in an embodiment of the present invention, cluster 330 includes all calls that are associated with a particular device (e.g., MSID).

In a further embodiment, cluster analyzer 262 determines a location among cluster 330 that might serve as an epicenter of fraudulent activity. Identifying such a location might assist with stopping fraudulent activity that originates from that location. For example, an individual, who is perpetuating fraudulent activity, might have an established geographical location from which the individual distributes mobile devices, which are associated with telecommunication accounts having balances due that will not be paid. Identifying that geographical location can assist with locating that individual and stopping the fraudulent activity.

In one embodiment, cluster analyzer 262 determines an approximate centroid of cluster 330 (shown in FIG. 3). That is, each location A-I of each mobile device 242 and 332 is represented by a respective first coordinate and a respective second coordinate. For example, circle 312 of FIG. 3 depicts cluster 330 plotted on an x-y coordinate graph having an origin, such that each location A-I includes a respective x-y coordinate. Cluster 330 might be plotted on the x-y coordinate graph by converting the latitude coordinate and longitude coordinate of each location A-I into x-y coordinates. As indicated above, in an embodiment, cluster 330 might include several additional locations that represent all calls of a particular device and that are used to compute an approximate centroid.

Cluster analyzer 262 also determines a mean of the first coordinate based on all respective first coordinates of the set of mobile devices and determines a mean of the second coordinate based on all respective second coordinates of the set of mobile devices. That is, a mean of all x coordinates of locations A-I is determined, and a mean of all y coordinates of locations A-I is determined. An approximate centroid is represented by the mean of all x coordinates and the mean of all y coordinates. The coordinates of the centroid can be converted back to a latitude coordinate and longitude coordinate to identify the possible epicenter of fraudulent activity. Providing this geographical information, such as to proper authorities, can assist with stopping the fraudulent activity.

An embodiment of the present invention includes a set of embodied computer-executable instructions that facilitates various aspects of the invention. Furthermore, illustrative operating environments 110 and 210, which are described above, are usable to facilitate a method of detecting unauthorized use of telecommunication services that are attributable to an account. That is, communication records associated with an account can be tracked by network 220 and analyzed by fraud detector 256 in a manner that enables network 220 (or fraud detector 256) to deem when fraudulent activity might have occurred. For example, communication records might be tracked over a course of an interval (e.g., day, week, or month) and analysis executed at the end of the interval to determine if fraudulent activity is occurring. As described above, analysis might include comparing a dialed-number entropy, an average pair-wise distance, and an incoming-call quantity to relevant thresholds.

Figure 4:
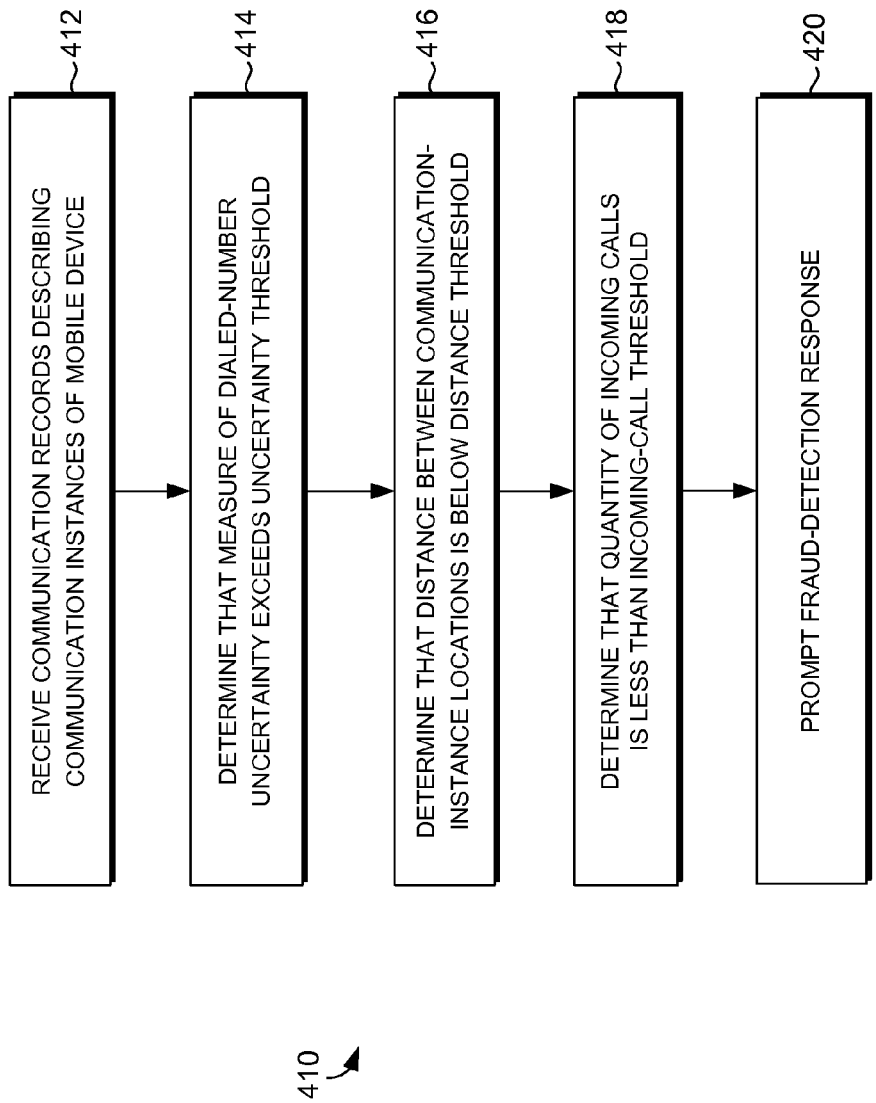
FIG. 4 depicts a flow diagram in accordance with an embodiment of the present invention.

Now referenced is FIG. 4, which depicts an exemplary method 410 of detecting mobile-device-account fraud. In describing FIG. 4, reference will also be made to FIGS. 1-3.

For example, fraud detector 256 of FIG. 2 includes a method 270 that utilizes other elements of FIG. 2, such as dialed numbers 264 and locations 266, and that provides an example of steps described in method 410. Method 270 is executed using application 260 of fraud detector 256.

Method 410 includes at step 412 receiving communication records describing communication instances of a mobile device. For example, communication records might include a set of dialed numbers 264 and a set of locations 266. Moreover, communication records might be received by fraud detector 256.

Step 414 includes determining that a measure of dialed-number uncertainty among the set of dialed numbers exceeds an uncertainty threshold. For example, step 272 in FIG. 2 includes determining that the dialed-number uncertainty of dialed numbers 264 exceeds an uncertainty threshold. As previously described, a measure of dialed-number uncertainty might be determined by calculating Shannon entropy of a set of dialed numbers. As such, fraud detector 256 might calculate Shannon entropy of the set of dialed numbers 264 and compare the Shannon entropy to an uncertainty threshold (e.g., Shannon-entropy threshold) stored in threshold datastore 258.

Step 416 includes determining that an average distance between locations of the set of communication-instance locations does not exceed a distance threshold. For example, step 274 in FIG. 2 includes determining that the average distance between locations 266 is below a distance threshold. As previously described with reference to FIG. 3, an average pair-wise distance of all locations 266 might be determined. The average pair-wise distance might then be compared to a distance threshold stored in threshold datastore 258.

Step 418 includes determining that a quantity of incoming calls received by the mobile device is less than an incoming-call threshold and a similar step 276 is depicted in FIG. 2. That is, fraud detector 256 might determine a number of incoming calls that are included among set 214 of communication records and compare the number of incoming calls to a incoming-call threshold stored in threshold datastore 258.

Steps 420 and 278 include prompting a fraud-detection response. That is, a fraud-detection response might be prompted when the dialed-number uncertainty is exceeded and the incoming-call threshold and distance threshold are not exceeded. As described previously, a fraud-detection response might include flagging an account associated with the mobile device, sending a notification to a notification recipient, and/or terminating services provided to the mobile device. Moreover, a fraud-detection response might include clustering locations of the mobile device with locations of a set of mobile devices that share a geographical relationship. For example, a distance-based clustering algorithm might be applied as depicted in circle 312 of FIG. 3. Once a cluster has been determined, an approximate centroid of the cluster can be used to suggest a likely geographical location of fraudulent activity.

In an embodiment of the present invention, detecting when a use might be unauthorized is usable to trigger various desired actions. For example, an account might be flagged to indicate a possible unauthorized use. In addition, services of an account might be frozen or terminated altogether. Further, an alarm (e.g., visual indicator) might be triggered that notifies an alarm recipient of the possible unauthorized use.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method of detecting mobile-device-account fraud, the method comprising:
   receiving communication records describing a plurality of communication instances of a mobile device, wherein the communication records include a set of dialed numbers and a set of communication-instance locations;
   determining that a measure of dialed-number uncertainty among the set of dialed numbers exceeds an uncertainty threshold;
   determining that an average distance between locations of the set of communication-instance locations does not exceed a distance threshold;
   determining that a quantity of incoming calls received by the mobile device is less than an incoming-call threshold;
   prompting a fraud detection response that includes clustering locations of the set of communication-instance locations with other locations of a set of mobile devices that share a geographical relationship; and
   determining an approximate centroid of the locations that are clustered, wherein the centroid is usable to suggest a call-shop location.

2. The one or more non-transitory computer-readable media of claim 1, wherein the plurality of communication instances include sending a text message, sending an instant message, transmitting a voicemail message, sending an email message, or initiating a voice communication.

3. The one or more non-transitory computer-readable media of claim 1,
   wherein determining that the measure of dialed-number uncertainty exceeds the uncertainty threshold includes calculating Shannon entropy of the set of dialed numbers, and
   wherein the uncertainty threshold includes a Shannon-entropy threshold.

4. The one or more non-transitory computer-readable media of claim 1, wherein each location includes a geographical coordinate, a base-station location of a cell, or a centroid of a cell sector.

5. The one or more non-transitory computer-readable media of claim 1, wherein determining that the average distance does not exceed the distance threshold includes:
   calculating a pair-wise distance between each location in the set of locations,
   calculating an average of all pair-wise distances among the set of locations, and
   determining that the average does not exceed the distance threshold.

6. The one or more non-transitory computer-readable media of claim 1, wherein the incoming-call threshold is one incoming call.

7. The one or more non-transitory computer-readable media of claim 1, wherein the fraud-detection response includes flagging an account associated with the mobile device, sending a notification to a notification recipient, terminating services provided to the mobile device, or a combination thereof.

8. One or more non-transitory computer-readable media having computer-executable instructions embodied thereon that, when executed, perform a method of detecting mobile-device-account fraud, the method comprising:

receiving communication records describing a plurality of communication instances of a mobile device, wherein each communication record includes a respective set of instance attributes;

analyzing an instance attribute among the communication records to detect a violation of an authorized-use parameter;

clustering locations of the mobile device with other locations of a set of mobile devices that share a geographical relationship and that include respective instance attributes that violate the authorized-use parameter; and based on the clustering, determining a location at which fraudulent activity is suspected by determining an approximate centroid of the locations that are clustered.

9. The one or more non-transitory computer-readable media of claim 8, wherein the respective set of instance attributes includes a set of dialed numbers and a set of communication-instance locations.

10. The one or more non-transitory computer-readable media of claim 9, wherein analyzing includes determining that a measure of dialed-number uncertainty among the set of dialed numbers exceeds an uncertainty threshold.

11. The one or more non-transitory computer-readable media of claim 9, wherein analyzing includes determining that an average distance between locations of the set of communication-instance locations does not exceed a distance threshold.

12. The one or more non-transitory computer-readable media of claim 8, wherein analyzing includes determining that a quantity of incoming calls received by the mobile device is less than an incoming-call threshold.

13. The one or more non-transitory computer-readable media of claim 8, wherein clustering the locations includes applying a distance-based clustering algorithm.

14. One or more non-transitory computer-readable media having computer-executable instructions embodied thereon that, when executed, perform a method of detecting mobile-device-account fraud, the method comprising:

receiving communication records describing a plurality of communication instances of the mobile device, wherein the communication records include a set of dialed numbers and a set of communication-instance locations;

determining that a Shannon entropy of dialed numbers included in the set of dialed numbers exceeds a Shannon-entropy threshold;

determining that an average distance between locations of the set of communication-instance locations does not exceed a distance threshold;

determining that a number of incoming calls exceeds an incoming-call threshold;

when the Shannon-entropy threshold value is exceeded and the distance threshold and the incoming-call threshold are not exceeded, clustering locations of the set of communication-instance locations with other locations of mobile devices that share a geographical relationship; and based on the clustering, determining a location at which fraudulent activity is suspected by determining an approximate centroid of the locations that are clustered.

15. The one or more non-transitory computer-readable media of claim 14, wherein clustering locations includes applying a distance-based clustering algorithm.

16. The one or more non-transitory computer-readable media of claim 14, wherein Shannon entropy is calculated using a formula that is represented by:

$$H(A) = -\sum_{i=1}^{m} (k_i/T)\log_2(k_i/T)$$

wherein $k_i$ is equal to a number of times the mobile device sent information to be transmitted to a particular dialed number, and wherein T is equal to a total number of times the mobile device sent information to be transmitted to any dialed number.

17. The one or more non-transitory computer-readable media of claim 14, wherein determining the approximate centroid includes:

representing a location of each mobile device by a respective first coordinate and a respective second coordinate;

determining a mean of the first coordinate based on all respective first coordinates of the set of mobile devices; and determining a mean of the second coordinate based on all respective second coordinates of the set of mobile devices, wherein the centroid is represented by the mean of the first coordinate and the mean of the second coordinate.

* * * * *